Dec. 22, 1925.
F. U. ROSS
1,566,563
LAMP STEM ANNEALING MACHINE
Filed July 27, 1922
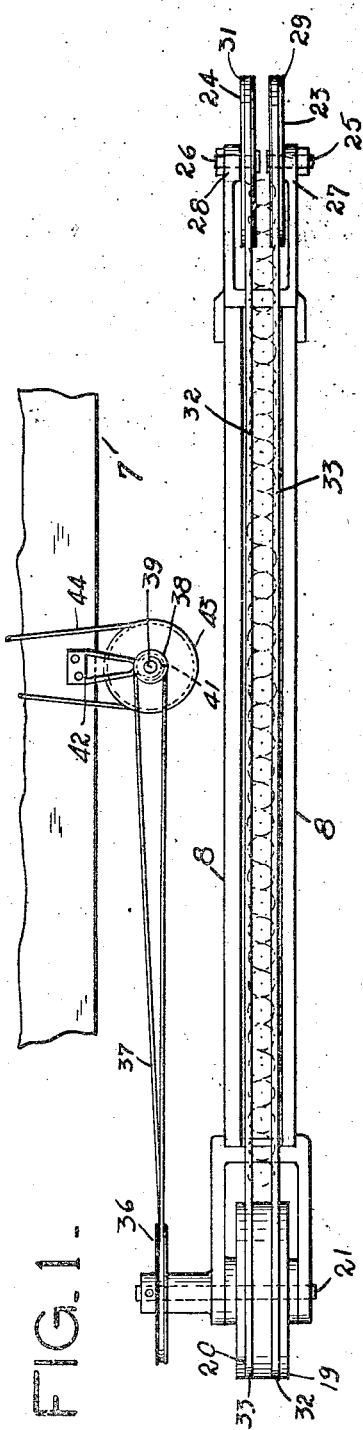
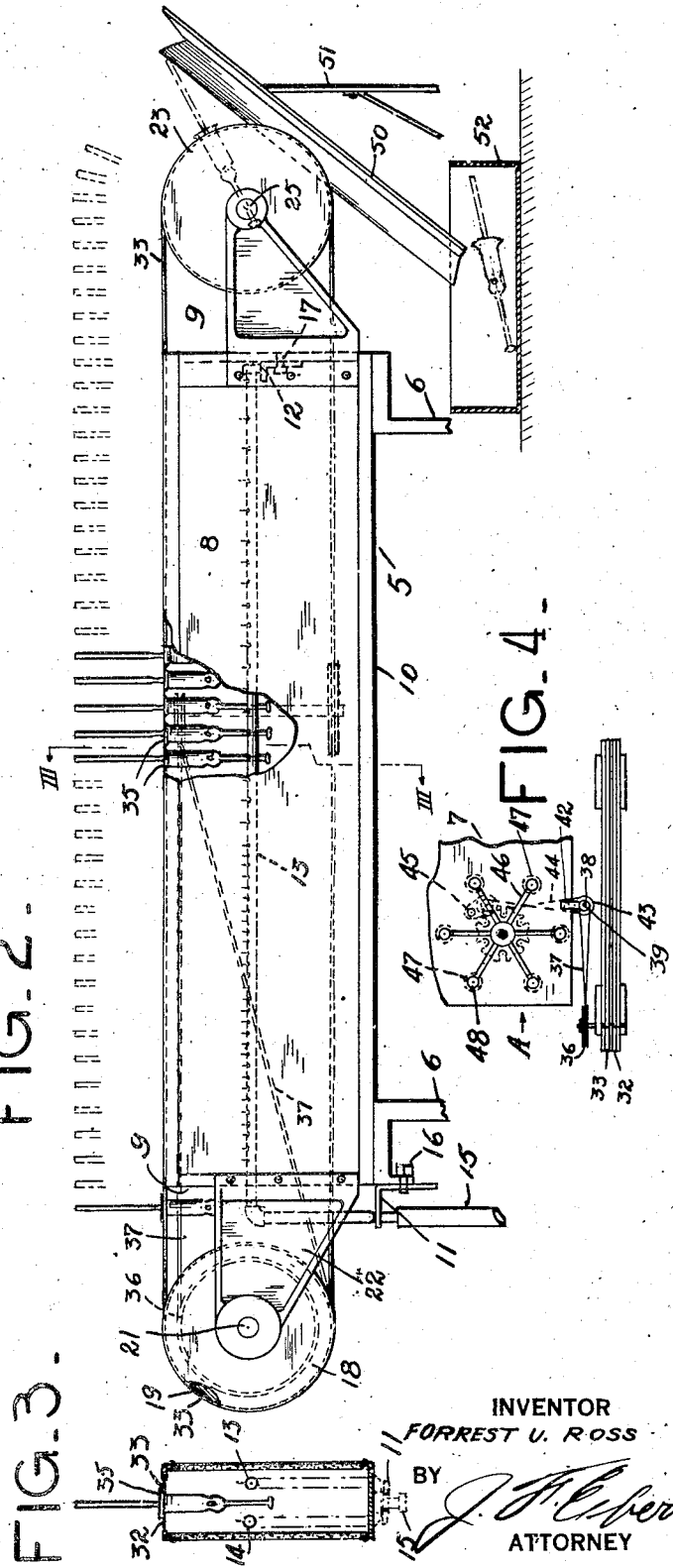
INVENTOR
FORREST U. ROSS
BY
J. F. Ebert
ATTORNEY Patented Dec. 22, 1925.

1,566,563

UNITED STATES PATENT OFFICE.

FORREST URBAN ROSS, OF EAST ORANGE, NEW JERSEY, ASSIGNOR TO WESTINGHOUSE LAMP COMPANY, A CORPORATION OF PENNSYLVANIA.

LAMP-STEM-ANNEALING MACHINE.

Application filed July 27, 1922. Serial No. 577,859.

*To all whom it may concern:*

Be it known that I, FORREST URBAN ROSS, a citizen of the United States, and a resident of East Orange, in the county of Essex and State of New Jersey, have invented a new and useful Improvement in Lamp-Stem-Annealing Machines, of which the following is a specification.

The invention relates to a machine for annealing glass lamp-parts and relates more particularly to a machine for annealing electric incandescent lamp-stems.

An object of the invention is to provide a machine for automatically moving a lamp-stem through a heat-zone and subsequently discharging the stem.

Another object of the invention is to provide a machine in which stems may be moved at a uniform rate of speed through a heat-zone of varying intensity.

A further object of the invention is to provide an annealing device adapted to co-operate with a stem-making machine to expedite the annealing of stems after their removal from the stem-making machine.

Other objects and advantages will be apparent from the following description.

The manufacture of a lamp-stem requires the union of several glass work-parts as well as conducting elements such as the leading-in wires. The several work-parts and wires are disposed in proper relation, heat is then applied to render plastic certain portions of the work-parts after which the plastic portions are compressed, forming the stem-press to unite the several glass parts. Leading-in wires are also sealed within the body of the press at the time the press is formed.

Since the glass-parts of a stem are subjected to variations in temperature and undergo certain strains due to the mechanical formation of the press, it is desirable, subsequently, to anneal the stem to relieve any strains or stresses that may have been set up within the material. Subsequent detrimental breaks and cracks are thus avoided when the stem is later incorporated in a lamp, wherein the stem is subject to alternate heating and cooling.

Heretofore, the annealers were usually of a type which required the operator to slide or push the stems along a guide adjacent an annealing fire. The irregular application of the stem to the fire, owing to the personal factor, resulted in variations in the degree of annealing given each stem, thus liability to shrinkage.

The present invention provides mechanism for automatically moving stems over or through a heat-zone at a uniform rate of speed. Furthermore, the device is operable in conjunction with a stem-making apparatus, it merely being necessary for the operator to place each stem removed from the apparatus in position in the annealer. The manual operation does not entail any special effort on the part of the operator, and but slight distraction from other duties is required, thus leaving the operator free to devote a greater amount of attention to the making of stems.

A machine embodying the feature of this invention may comprise a heat-zone, preferably created by a plurality of gas flames enclosed in a chamber having its upper side open but adapted to be substantially covered by the flared portions of the stems during the annealing operation. The flames are preferably adjusted to produce a decrease in temperature from the entering position of the stems to the unloading position. A conveyor for moving stems, with portions thereof in the heat-zone, may comprise a driving pulley and guide pulleys for moving a pair of belts in parallel spaced relation upon which the stems may be positioned.

It has been found that good results are obtained with a temperature gradient of from 450° to 200° C. over a distance of approximately 24″, and the preferable rate of movement of a stem through the heat-zone as above given may be approximately five inches per minute.

The invention will be more fully understood by reference to the accompanying drawing in which, Fig. 1 is a plan view of the annealing machine shown in operative relation to a stem-making machine, a fragment only of the latter being shown;

Fig. 2 is a view, in elevation, of the annealing machine, partly in section;

Fig. 3 is a vertical section taken on line III—III of Fig. 2; and,

Fig. 4 is a diagrammatic plan view of the invention shown in operative relation to a stem-making machine and indicates, in dotted lines, the mechanical connection between the two machines.

A preferred embodiment of the invention may comprise a chamber or compartment 5, (Fig. 2) supported on legs 6 and adapted to be conveniently positioned in proper relation to a lamp-part-making machine 7. The chamber 5 may be of rectangular form having side walls 8, end walls 9 and a bottom plate 10. The upper side of the chamber, however, may be open and the chamber may be of such proportions as to provide an elongated or trough-shaped compartment, the walls of which may be of any suitable heat-insulating material, such as asbestos or the like.

Within the chamber and suitably supported upon adjustable brackets 11 and 12 is a burner including two pipes 13 and 14 connected to a suitable gas-supply line 15. Vertical adjustment of the burners may be had by manipulation of bolts 16 and 17 which normally secure the brackets 11 and 12, respectively. The pipes 13 and 14 are provided with a plurality of openings through which fuel is discharged. The discharge openings may be of such dimensions or spacing as to cause the flames to decrease the intensity of heat from one end of the burner to the other. It has been found preferable, however, to vary the intensity of heat by gradually increasing the spacing of the flames from the loading end to the unloading end of the annealer. Thus, a temperature gradient or variation in the intensity of the heat-zone is produced, and a stem passing from the loading position to the unloading position is heated to a given temperature and subjected to gradually decreasing temperatures.

Means for conveying stems through the heat-zone may consist of a suitable conveyor comprising a driving pulley 18 provided with two parallel peripheral grooves 19 and 20. The pulley is pinned to a shaft 21 mounted in a bearing integral with a bracket 22 secured to the loading end of the machine.

At the opposite or unloading end of the annealer, a pair of guide pulleys 23 and 24 are mounted on shafts 25 and 26, respectively. The shafts are journaled in bearings 27 and 28 which are suitably secured to the chamber 5 by means of bracket 30. The guide pulleys 23 and 24 are provided with peripheral grooves 29 and 31, respectively, and are so disposed with relation to the driving pulley 18 that the groove 19 of the driving pulley and the groove 29 of the guide pulley 23 are in the same vertical plane and the groove 20 and the groove 31 are similarly disposed in a parallel plane. A pair of heat-resisting belts 32 and 33, which preferably comprise thin steel tapes, are positioned about the pulleys and confined thereon in parallel relation by the aforementioned grooves. The belts constitute movable stem-supporting members and are adapted to transport stems by frictional engagement with the flare or annular portions of the stems. Thus, the stems may be moved through the heat-zone, with their longitudinal axes vertical and the press portions of the stem in the desired relation to the heat-zone.

The position of the pulleys with relation to the chamber 5 is such that the belts moving about the pulleys may pass over the heat-zone within the chamber and in a plane substantially flush with the top edge of the chamber and also serve as a partial closure for the chamber, the lower or return sections of the belts passing through suitable apertures in the end walls 9 of the chamber 5. The spacing between the belts is sufficient to receive the cylindrical or so-called flare-tube-portion of stems, the stems being supported by the belts through the flare or flanged portions 35. When a plurality of stems have been applied to the annealer the flanged portions of the stems serve, substantially, to close the chamber, thus helping to reduce heat losses.

When the present device is properly positioned in relation to a stem-making machine, it may be driven therefrom by means of a belt sheave 36 which is secured to the shaft 21 and driven by an endless belt 37, the latter engaging a sheave 38 secured to the upper end of a vertical shaft 39 rotatable in a bearing 41 integral with a bracket 42, which may be secured to the stem-making machine 7.

At the lower end of the shaft 39 may be fastened a pulley 43 which, in turn, may be driven by means of a belt 44, which may pass around any suitable continuous driving element, as pulley 45, of a stem-making machine (see Fig. 4). As indicated, it is preferable to connect the annealer with the shaft upon which the toothed member 45 of a Geneva movement is secured, which movement causes an intermittent rotation of a spider 46 having stem heads 47 rotatable in hubs 48. The Geneva movement may be actuated by any suitable source of power, as by a motor (not shown). Stem-making machines of the character to which the present invention is applicable are well-known in the art.

For the purpose of receiving and guiding annealed stems to any desired position, a chute 50 (Fig. 2), supported on a suitable bracket 51, may be properly located at the discharge end of the annealer.

Stems, discharged from the annealer may slide down the chute 50 and be received in a suitable container 52 or, if desirable, may be guided to a remote hopper.

In practice, an operator attends the stem-making machine from the position indicated by the letter "A" in Fig. 4. As the spider 46 rotates intermittently, the operator removes a stem from one of the stem-heads and places it in the annealer with the flare resting on the belts 32 and 33 and the press portion depending therefrom so that it is moved through the heat-zone. The conveyor and the annealer may be driven at such rate that the conveyor will move a positioned stem a distance slightly greater than the diameter of the flare by the time the operator has removed another stem from the stem-making machine. It will thus be seen that, by properly timing the annealer with relation to the stem-making machine, the stems may be conveyed through the heat-zone at a rate in accordance with the rate of production of the stems. When the annealer has been completely filled with stems, the flares or flanges 35 which bridge the space between the belts constitute a cover or closure for the chamber 5, and conservation of heat is effected.

As the belts move, stems are continually being discharged over the guide pulleys 23 and 24 and into chute 50 and are led to a receptacle 52. Thus the two elements or machines may cooperate to produce a finished electric incandescent lamp-stem.

If desired, the steel tapes or belts 32 and 33 may be driven at different speeds, thus effecting a rotation of the stems by carrying one side of the flare ahead faster than the other side and, in this way, securing a more uniform heat treatment or annealing.

Although a preferred embodiment of the invention has been shown and described herein, it is obvious that other modifications may be made therein without departing from the spirit and scope of the appended claims.

What is claimed is:

1. An apparatus for annealing lamp-stems comprising a chamber, an opening disposed longitudinally of said chamber, means for creating a heat-zone within said chamber having a temperature gradient, means adjacent to said opening for automatically conveying stems through said zone and means for supporting stems with their flared portions bridging said opening.

2. An apparatus for annealing lamp-stems comprising a chamber, means for creating a heat-zone within said chamber having a temperature gradient and a conveyor comprising a plurality of belts for engagement with the flare portions of stems and means for actuating said conveyor to move portions of the lengths of said stems through said heat zones.

3. An apparatus for annealing lamp-stems comprising a chamber having an aperture therein, means for producing a temperature gradient within said chamber and means adjacent said aperture for automatically moving portions of lamp-stems within said chamber to subject said portions to gradually varying temperatures.

4. An apparatus for annealing lamp-stems comprising a chamber having an aperture at one side, means for producing a temperature gradient within said chamber and means adjacent said aperture to automatically convey stems longitudinally of the chamber, to subject the stems to gradually changing temperatures.

5. An apparatus for annealing lamp-stems comprising a chamber, means for creating a temperature gradient within said chamber, an elongated aperture in one side of said chamber, a conveyor-belt disposed within said aperture for engagement with the flare portions of the stems to move relatively long portions of said stems within said chamber and means for discharging said stems from said conveyor.

6. An apparatus for annealing lamp-stems comprising a chamber, means for creating a heat-zone within said chamber and two movable members disposed in parallel operative relation to said zone said members being adapted to support stems with the flare portions thereof bridging said members and with portions thereof disposed in said zone.

7. An apparatus for annealing lamp-stems comprising a chamber, means for creating a heated atmosphere in said chamber, two movable members disposed in parallel operative relation to said chamber and adapted to convey stems with portions thereof disposed in said chamber and means for discharging said stems from said conveyor.

8. An apparatus for annealing lamp-stems comprising a chamber having an elongated opening on one side thereof, means for creating a heated atmosphere within said chamber and means for moving stems with the flare portions thereof disposed over said aperture, whereby said flares substantially constitute a closure.

9. An apparatus for annealing lamp-stems comprising a chamber having an elongated opening on one side thereof, a plurality of burners within said chamber to produce a temperature gradient and a movable support adapted to engage the flare portions of stems to convey said stems with portions thereof disposed within said chamber and subjecting the stems to gradually decreasing temperatures.

10. An apparatus for annealing lamp-stems comprising a chamber having an aperture at one side thereof, means for creating a heated atmosphere in said chamber and automatically movable stem-supporting members disposed adjacent said aperture and adapted to receive and support stems with the flange portions thereof bridging said aperture and the lower portions of said stems disposed within said chamber.

11. An apparatus for annealing lamp stems comprising a chamber having an aperture at one side thereof, means for creating a heated atmosphere in said chamber, automatically movable stem-supporting members disposed adjacent said aperture and adapted to receive and support stems with the flange portions thereof bridging said aperture and the lower portions of said stems disposed within said chamber and means for discharging said stems consecutively from said supports.

12. An apparatus for annealing lamp-stems comprising a chamber having an aperture at one side thereof, means for creating a temperature gradient within said chamber, an automatically movable stem-support associated with said chamber adapted to engage with flare portions of stems to move them with their axial lines vertical and move the stems to subject portions thereof to said varying temperature within said chamber.

In testimony whereof, I have hereunto subscribed my name this 25th day of July, 1922.

FORREST URBAN ROSS.